US011102748B2

(12) United States Patent
Olofsson et al.

(10) Patent No.: US 11,102,748 B2
(45) Date of Patent: Aug. 24, 2021

(54) INTER NETWORK CELL RELATIONSHIP MAPPING

(71) Applicant: Telefonaktiebolaget LM Ericsson (publ), Stockholm (SE)

(72) Inventors: Håkan Olofsson, Stockholm (SE); Tomas Hedberg, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/323,540

(22) PCT Filed: Aug. 30, 2016

(86) PCT No.: PCT/SE2016/050811
§ 371 (c)(1),
(2) Date: Feb. 6, 2019

(87) PCT Pub. No.: WO2018/044211
PCT Pub. Date: Mar. 8, 2018

(65) Prior Publication Data
US 2019/0174453 A1 Jun. 6, 2019

(51) Int. Cl.
*H04W 64/00* (2009.01)
*H04W 24/10* (2009.01)
(Continued)

(52) U.S. Cl.
CPC ......... *H04W 64/003* (2013.01); *H04L 5/0048* (2013.01); *H04W 24/02* (2013.01); *H04W 24/10* (2013.01); *H04W 36/0085* (2018.08)

(58) Field of Classification Search
CPC ... H04W 64/003; H04W 24/02; H04W 24/10; H04W 36/0085; H04L 5/0048
See application file for complete search history.

(56) References Cited

U.S. PATENT DOCUMENTS

2003/0148774 A1* 8/2003 Naghian ............... H04W 64/00
455/456.1
2007/0249341 A1* 10/2007 Chu ...................... H04W 16/02
455/434

(Continued)

FOREIGN PATENT DOCUMENTS

EP 2 922 334 A1 9/2015
WO WO 2014/163571 A1 10/2014

OTHER PUBLICATIONS

International Search Report and Written Opinion of the International Searching Authority, PCT/SE2016/050811, dated May 5, 2017, 10 pages.

*Primary Examiner* — Jael M Ulysse
(74) *Attorney, Agent, or Firm* — Sage Patent Group

(57) ABSTRACT

The present disclosure relates to a method, performed in a network node of a first network, for designating one or more cells of a second network as neighbouring cells to the first network. The method comprises selecting a set of carriers employed in the second network and transmitting information for the selected set of carriers to a wireless device served by the first network. Measurement reports are received for respective carriers from the wireless device. The network node determines neighbour cell relations between the first network and one or more cells of the second network based on the received measurement reports.

10 Claims, 7 Drawing Sheets

(51) Int. Cl.
*H04W 24/02* (2009.01)
*H04L 5/00* (2006.01)
*H04W 36/00* (2009.01)

(56) References Cited

U.S. PATENT DOCUMENTS

| | | | | |
|---|---|---|---|---|
| 2010/0317350 A1* | 12/2010 | Lee | ................... | H04W 36/0016 |
| | | | | 455/442 |
| 2011/0312316 A1* | 12/2011 | Baldemair | ............ | H04W 24/10 |
| | | | | 455/422.1 |
| 2012/0039284 A1* | 2/2012 | Barbieri | ................ | H04W 48/10 |
| | | | | 370/329 |
| 2012/0129522 A1* | 5/2012 | Kim | ................... | H04W 72/0426 |
| | | | | 455/434 |
| 2012/0225658 A1* | 9/2012 | Oostveen | ........ | H04W 36/00835 |
| | | | | 455/437 |
| 2012/0243498 A1* | 9/2012 | Kwon | ...................... | H04L 5/00 |
| | | | | 370/329 |
| 2013/0079005 A1* | 3/2013 | Watanabe | ......... | H04W 36/0085 |
| | | | | 455/435.1 |
| 2013/0084892 A1* | 4/2013 | Teyeb | ................... | H04W 48/16 |
| | | | | 455/456.6 |
| 2014/0051428 A1* | 2/2014 | Jung | ..................... | H04W 24/08 |
| | | | | 455/422.1 |
| 2014/0241250 A1* | 8/2014 | Jung | ..................... | H04W 24/10 |
| | | | | 370/328 |
| 2014/0315593 A1* | 10/2014 | Vrzic | ................... | H04W 52/228 |
| | | | | 455/522 |
| 2014/0355463 A1* | 12/2014 | Smith | ................... | H04W 24/02 |
| | | | | 370/252 |
| 2014/0355570 A1* | 12/2014 | Smith | ............... | H04W 36/0072 |
| | | | | 370/332 |
| 2015/0092750 A1* | 4/2015 | Huang | ................. | H04W 36/28 |
| | | | | 370/331 |
| 2015/0126201 A1* | 5/2015 | Beppler | ................ | H04W 36/04 |
| | | | | 455/444 |
| 2015/0131544 A1* | 5/2015 | Behravan | .............. | H04L 5/0035 |
| | | | | 370/329 |
| 2015/0257060 A1* | 9/2015 | Goto | .................... | H04L 5/0032 |
| | | | | 370/331 |
| 2015/0264699 A1* | 9/2015 | Fwu | ........................ | H04L 5/003 |
| | | | | 370/329 |
| 2015/0327328 A1* | 11/2015 | Novak | ................ | H04W 72/085 |
| | | | | 455/11.1 |
| 2016/0021595 A1* | 1/2016 | Czaja | .................... | H04W 36/32 |
| | | | | 455/440 |
| 2016/0095007 A1* | 3/2016 | Tian | ...................... | H04W 24/02 |
| | | | | 370/252 |
| 2016/0157120 A1* | 6/2016 | Shi | ........................ | H04W 24/08 |
| | | | | 370/252 |
| 2016/0183263 A1* | 6/2016 | Liu | ........................ | H04W 24/10 |
| | | | | 370/329 |
| 2016/0198360 A1* | 7/2016 | Smith | ............... | H04W 28/0289 |
| 2016/0227427 A1* | 8/2016 | Vajapeyam | ........... | H04W 24/00 |
| 2016/0302203 A1* | 10/2016 | Liu | ....................... | H04L 5/0098 |
| 2016/0330730 A1* | 11/2016 | Smith | ................... | H04W 48/18 |
| 2016/0373970 A1* | 12/2016 | Kulal | ................ | H04W 36/0009 |

\* cited by examiner

INTER NETWORK CELL RELATIONSHIP MAPPING

CROSS REFERENCE TO RELATED APPLICATIONS

This application is a 35 U.S.C. § 371 national stage application of PCT International Application No. PCT/SE2016/050811 filed on Aug. 30, 2016, the disclosure and content of which is incorporated by reference herein in its entirety.

TECHNICAL FIELD

The present disclosure relates to methods, network node, wireless device and computer program products for designating one or more cells of a second network as neighbouring cells to a first network. More specifically, the disclosure provides mapping of inter network cell relationships.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Radio Access Network, E-UTRAN.

At the outset, the spectrum used for LTE was dedicated, i.e., licensed, to LTE. This has the advantage that operators offering an LTE system could perform cell planning and optimization without needing to consider coexistence of other operator networks as an aspect relevant for spectrum efficiency. With the ever increasing demand for mobile broadband services and increased throughput in wireless communication networks, the licensed spectrum is no longer sufficient to meet current and future demands. Therefore, LTE operation in a combination of licensed spectrum and un-licensed spectrum is now being considered, as well as LTE operation in locally licensed spectrum, e.g., within a system set up for an enterprise. In a particular area there can thus simultaneously exist "normal cellular systems" on classical licensed spectrum and cellular systems on locally assigned carriers, e.g., 3.5 GHz carriers.

Enterprises are increasingly requiring the same connectivity and services inside and outside the office or plant. There is a trend of Bring-your-own-device, BYOD, implying that enterprise personnel, e.g., employees and consultants, bring their own devices. Such devices are usually associated with or even locked to a specific operator. The enterprise will thus need to support several operators within the premises of the enterprise, which would imply a need for respective indoor networks for all operators. Such an option is not cost efficient, due to amount of radio equipment needed to cover many frequency bands. From a cost perspective it is preferred to use one set of radio equipment for all users. Thus, there is a cost reduction potential by implementing shared networks. However, current regulations and business logic implies that existing outdoor networks will remain separate, at least during the foreseeable future. One possible scenario is disclosed in FIG. 1, illustrating two macro cellular networks PLMN A, PLMN B with different network identities (in current cellular systems denoted Public Land Mobile Network, PLMN), mainly outdoors, and shared micro cellular networks, e.g., indoor networks, PLMN $X_1$, PLMN $X_2$, which macro cellular network PLMN A, PLMN B users should be able to use while positioned indoors. Thus, a scenario with multiple outdoor macro cellular networks PLMN A, PLMN B operated by separate operators, and islands of local shared networks PLMN $X_1$, PLMN $X_2$ operated by one of operators A and B, or by a separate company may be envisioned. The various networks may use licensed spectrum, unlicensed spectrum, or a mix of the two, or, indeed, hybrid spectrum licensing regimes.

Examples of shared micro cellular networks, i.e. the above mentioned islands of local systems PLMN $X_1$, PLMN $X_2$ and in the following presented as shared network islands, comprise outdoor arenas and other venues, industry production plants or storage facilities with outdoor parts, campuses, open mines, etc. The indoor environment case should only be seen as one example of a confined environment where a shared network island is present.

In the scenario disclosed in FIG. 1, the shared micro cellular networks PLMN $X_1$, PLMN $X_2$ may architecturally be designed as 3GPP networks, with e.g. roaming interfaces or even interfaces allowing handover. This will imply that inter-network mobility situations will likely increase. As an example, there are new licensing initiatives to allow smaller enterprises to set up local networks per location. In general, geographically local spectrum licensing regimes, with dedicated spectrum devoted to various kinds of local systems may increase, and where the local system is still expected to provide service to in-roaming devices normally belonging to wide-area systems. One can envision a scenario wherein shared network islands PLMN $X_1$, PLMN $X_2$ are very common. One extreme form of this situation is where the shared network islands together form the entire network, i.e. the roaming occurs between such islands and there is no non-shared network portion. In some cases, e.g. MOCN, the micro cellular network may have the same identity as the surrounding macro cellular network, e.g. PLMN $X_1$=PLMN A.

Furthermore, while the scenarios above focus on mobile broadband services, all wireless devices with mobility, such as IoT sensor devices, are subject to the same challenges. In fact, the trend of spectrum licensing for dedicated service types such as Intelligent Traffic Systems, National Security & Public Safety service can result in geographically local systems, with roaming needs to other systems and frequency bands when a wireless device moves out of a local area to a more general system where basic connectivity is still wanted.

A wireless device accesses a new cellular network with a roaming operation. When entering a new cellular network, the wireless device tries to connect to this network. Migration between networks using roaming is primarily used when the wireless device is unable to access the original operator network. Other migration techniques comprise a set up with a gateway core network architecture, GWCN, or a multi operator core network, MOCN.

However, as a general rule, operators want to minimize interaction between each other when performing inter 3GPP network migration; since GWCN and MOCN introduce high dependencies between companies sharing part of the network architecture this would not be an attractive solution for inter 3GPP network migration. Present roaming techniques, on the other hand, provides for an acceptable level of interaction between operators, but has drawbacks in that roaming to a shared network island would be initiated only when the connection to the original network, i.e., the first macro cellular network, becomes unavailable for a wireless device. Thus, present day solutions for wireless device migration between different networks provide inadequate migration solutions, prevent migration control and optimized traffic distribution between the networks.

SUMMARY

An object of the present disclosure is to provide solutions which seek to mitigate, alleviate, or eliminate one or more of the above-identified deficiencies in the art and to provide solutions improving traffic distribution between a first network and a second network, e.g., between a macro cellular network and a micro cellular network.

This object is obtained by a method, performed in a network node, for designating one or more cells of a second network as neighbouring cells to the first network. The method comprises selecting a set of carriers employed in the second network and transmitting information for the selected set of carriers to a wireless device served by a cell of the first network. Measurement reports are received for respective carriers from the wireless device. The network node determines neighbour cell relations between the wireless device served by the first network and one or more cells of the second network based on the received measurement reports.

The disclosed method provides significant advantages with regard to mobility performance, by providing improved service in a second network to in-roaming devices normally belonging to a first network. Furthermore, when moving from the first network to the second network, that may be served by a different operator, collaboration and coordination is simplified between the two networks Thus faster discovery of the second system is possible, enabling faster handover and securing that users in a coverage area of the second system are really connecting to this system without the requirement for extensive inter-operator collaboration. Improved inter network traffic distribution is achieved whilst maintaining network integrity, i.e., transfer of information between the networks and the subscribers of the networks is controlled and minimized.

According to an aspect of the disclosure, the first network is a cellular radio access network, e.g., a macro cellular evolved radio access network, macro E-UTRAN, operated in a first spectrum, and the second network is another cellular radio access network, e.g., a micro cellular evolved radio access network, micro E-UTRAN, operated in a second spectrum different from the first spectrum. The micro E-UTRAN is configured to provide radio network coverage within an area of the macro E-UTRAN. Hence, the present solution is particularly advantageous in scenarios where a micro cellular network represents a network island within a large network area, e.g., for the situation where the micro cellular network is an enterprise network within an office building or industry plant and wherein a public land mobile network, PLMN, provides coverage in the surrounding area as well as in the area of the micro cellular network.

According to an aspect of the disclosure, the micro E-UTRAN is a cellular network operated in a predetermined, confined area, e.g., within an enterprise, open mine, campus, music festival or sports arena.

According to an aspect of the disclosure, the first spectrum is a licensed spectrum and/or the second spectrum is a locally licensed spectrum. Thus, the present disclosure provides a solution applicable to a growing use of geographically local spectrum licensing regimes, with dedicated spectrum devoted to various kinds of local systems, and where the local system is still expected to provide service to in-roaming devices normally belonging to wide-area systems.

According to another aspect of the disclosure, the determining of neighbour cell relations between the first network and one or more cells of the second network comprises associating the measurement results to a location in a location oriented map. Thus, in addition to gathering information on cell-to-cell relationships, it is also possible to associate such cell-to-cell relationships to geographical locations. Such a map may be used as an input to respective distribution functions in the first network and/or the second network, but also shared as input to further cellular networks providing coverage in the area of the second network. The distributions functions execute the distribution between various networks.

Thus, according to an aspect of the disclosure, the method further comprises transmitting information on the neighbor cell relations to one or more neighbouring network nodes of the first network or to one or more neighbouring network nodes of the second network.

The above mentioned object of the disclosure is also obtained by a computer readable storage medium, having stored thereon a computer program which, when executed in a network node, causes the network node to execute any of the above mentioned method embodiments.

Likewise, the object of the disclosure is obtained by a network node that is configured for operation in a first network for designating one or more cells of a second network as neighbouring cells to the first network. The radio network node comprises radio circuitry arranged for transmission and reception of radio signals. The radio network node further comprises processing circuitry configured to cause the network node to select a set of carriers employed in the second network and to transmit, using the radio circuitry, information for the selected set of carriers to a wireless device served by a cell of the first network. The radio network node receives, using the radio circuitry, measurement reports for respective carriers from the wireless device and determines neighbour cell relations between the first network and one or more cells of the second network based on the received measurement reports.

The network node and the computer program has the corresponding advantages of those described above in relation to the method performed in a network node.

The object to improve traffic distribution between a first network and a second network, e.g., respective macro and micro cellular networks, is also obtained by a method, performed in a wireless device served by a cell of a first network, for designating one or more cells of a second network as neighbouring cells to the first network. The method comprises receipt, from said network node of the first network, information on a set of carriers employed in the second network and performing measurements on selected one or more carriers from the set of carriers. The method further comprises transmission of measurement reports for respective carriers to the network node, the measurement reports being representative of neighbour cell relations between the wireless device serving cell and one or more cells of the second network.

The above mentioned object of the disclosure is also obtained by a computer readable storage medium, having stored thereon a computer program which, when executed in a wireless device, causes the wireless device to execute any of the above mentioned method embodiments.

Likewise, the object of the disclosure is obtained by a wireless device comprising radio circuitry arranged for transmission and reception of radio signals and processing circuitry. The processing circuitry is configured to, using the radio circuitry, cause the wireless device to receive information on a set of carriers employed in the second network and perform measuring on selected one or more carriers from the set of carriers. The processing circuitry is also configured to, using the radio circuitry, transmit measurement reports for respective carriers to the network node, the measurement reports being representative of neighbour cell relations between the wireless device serving cell and one or more cells of the second network.

The method performed in a wireless device, the wireless device and the computer program has the corresponding advantages of those described above in relation to the method performed in a network node.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
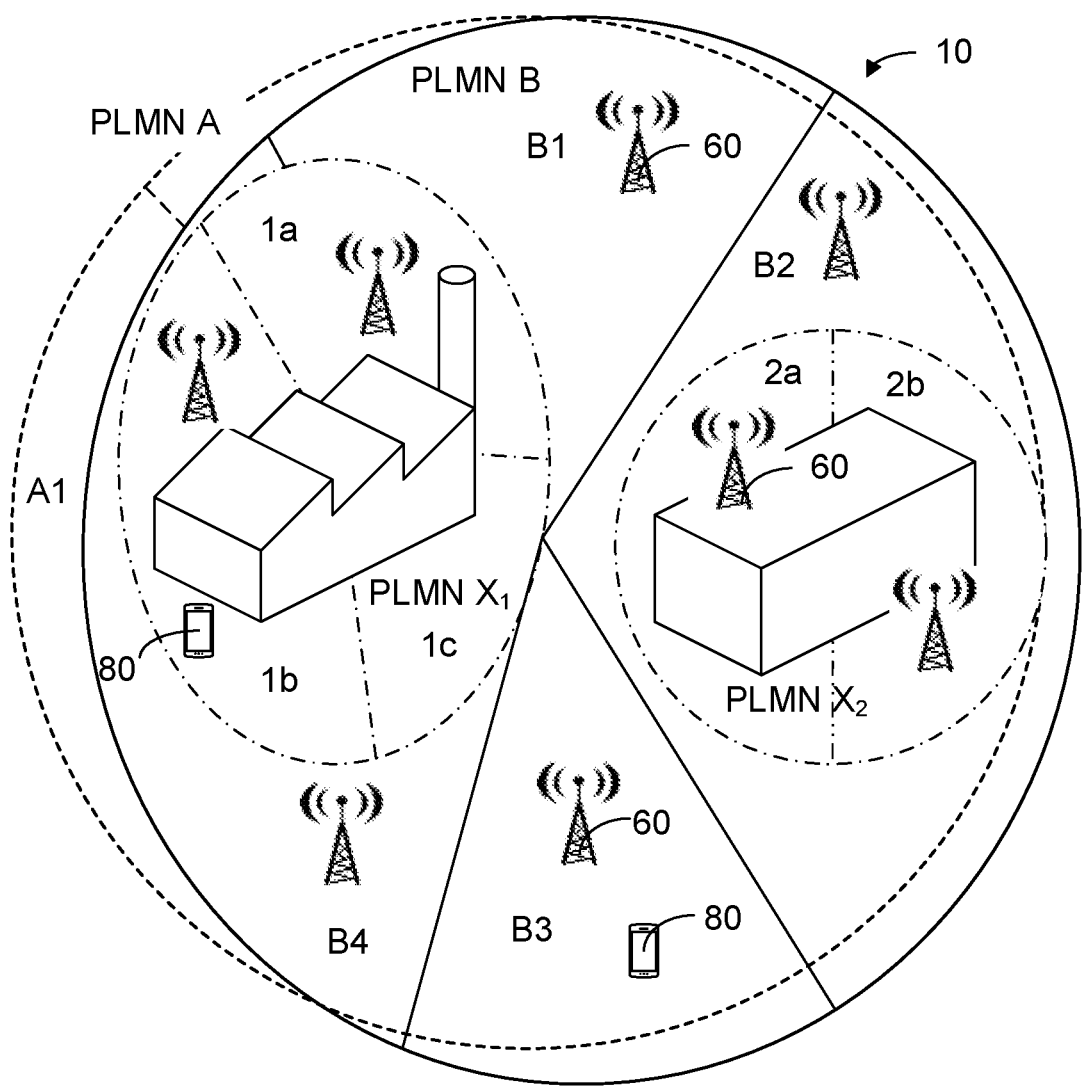
FIG. 1 discloses an overview of a macro and micro cellular network scenario.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments.

In some embodiments the term "network node" is used and it can correspond to any type of network node or any network node, which communicates with a UE and/or with another network node. Examples of network nodes are NodeB, base station, multi-standard radio, radio node, eNodeB, network controller, radio network controller, base station controller, relay, donor node controlling relay, base transceiver station, access point, transmission points, transmission nodes, nodes in distributed antenna system, DAS etc.

Within the context of this disclosure, the terms "wireless device" or "wireless terminal" encompass any terminal which is able to communicate wirelessly with another device, as well as, optionally, with an access node of a wireless network, by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

FIG. 1 discloses an overview of a macro and micro cellular network scenario, i.e., a network scenario comprising a plurality of macro cellular networks and a plurality of micro cellular networks. Two macro cellular networks PLMN A, PLMN B with different network identities (in current cellular systems denoted Public Land Mobile Network, PLMN), provide overlapping coverage in a large area, e.g., over a nationwide licensed spectrum. FIG. 1 schematically disclose a portion of this area for each of the two networks PLMN A and PLMN B. A wireless device 80 is served by a network node 60, also known as radio base station, RBS, or eNB, of cell B3. In confined areas within the coverage area of PLMN A and PLMN B, shared micro cellular networks, e.g., indoor networks, PLMN $X_1$, PLMN $X_2$, provide additional access to broadband coverage, i.e., within the more limited areas covered by these network. Thus, when located in an area of PLMN $X_1$ or PLMN $X_2$, wireless device 80 is able to connect to a radio base station of the respective microcellular network, e.g., a network operated in an indoor environment. In the disclosed scenario, multiple macro cellular networks PLMN A, PLMN B operated by separate operators, and islands of local shared networks PLMN $X_1$, PLMN $X_2$ operated by one of operators A and B, or by a separate company, are provided. The various networks may use licensed spectrum, unlicensed spectrum, or a mix of the two, or, indeed, hybrid spectrum licensing regimes.

Other examples of shared micro cellular networks, i.e. the above mentioned islands of local systems PLMN $X_1$, PLMN $X_2$ and in the following presented as shared network islands, comprise outdoor arenas and other venues, industry production plants or storage facilities with outdoor parts, campuses, open mines, etc. The indoor environment case should only be seen as one example of a confined environment where a shared network island is present.

In the scenario disclosed in FIG. 1, the shared micro cellular networks PLMN $X_1$, PLMN $X_2$ may architecturally be designed as 3GPP networks, with e.g. roaming interfaces or even interfaces allowing handover. Thus, while offering better the advantages of improved connectivity in the area of the micro cellular network, this scenario implies that inter-network mobility situations will likely increase and there will be an increased need for collaboration and coordination between the different networks.

Mobile Broadband services are demanded in more and more locations, also indoors. Enterprises are increasingly operating also out of the enterprise premises, requiring the same connectivity and services inside and outside the office. Thus, there is an increasing need for the above mentioned islands of local systems, PLMN $X_1$ and PLMN $X_2$ in FIG. 1. As an example, there are new licensing initiatives to allow smaller enterprises to set up local networks per location. In general, geographically local spectrum licensing regimes, with dedicated spectrum devoted to various kinds of local systems may increase, and where the local system is still expected to provide service to in-roaming devices normally belonging to wide-area systems.

Furthermore, there is a trend of Bring-your-own-device (BYOD), implying that enterprise personnel (employees, consultants, etc.) bring their own devices, usually associated with or even locked to a specific operator. The enterprise will thus often need to support several operators. A simple way is that all operators provide sufficiently good indoor coverage, which usually implies indoor network for all operators. However, this option is not cost efficient, due to amount of radio equipment needed to cover many frequency bands. From a cost perspective it is preferred to use a single radio chain for all users, i.e. one spectrum band. There is thus a cost reduction potential by designing shared network indoors.

The indoor networks, PLMN $X_1$ and PLMN $X_2$ may be configured in many ways as will be briefly outlined in the non-exhaustive list below.

As a Multi Operator Radio Access Network, MORAN, broadcasting PLMN A and PLMN B on separate cells and connecting to the PLMN A and B core networks.

As a Multi Operator Core Network Radio Access Network, MOCN RAN, broadcasting the PLMN A and PLMN B on shared cells and connecting to the PLMN A and B core networks.

As a MORAN network using separate PLMN $X_1$ and PLMN $X_2$ on different cells. PLMN $X_1$ is equivalent PLMN, EPLMN, to PLMN A and PLMN $X_2$ is EPLMN to PLMN B in order to support full mobility. PLMN $X_1$ can be supported by a separate core network, CN, from PLMN A, but the two CN needs to be interconnected to enable full mobility). PLMN $X_1$ can also be supported by the same CN as PLMN A.

As above, but for a MOCN network, wherein the cells broadcast both PLMN $X_1$ and PLMM $X_2$.

Using PLMN $X_1$ only for the local network. PLMN $X_1$ uses a separate CN from PLMN A and PLMN B, but with interconnected CNs $X_1$-A and $X_1$-B, to enable full mobility. PLMN $X_1$ is EPLMN with PLMN A and B to enable full mobility.

As above, but using "MOCN-methods" inside PLMN $X_1$ RAN to select PLMN A or B CN, i.e. all user equipments, UEs, are handled as "non-supporting".

As a MORAN network using separate PLMN $X_1$/PLMN $X_2$ or using PLMN $X_1$ only for the local network, but "roaming", possibly with "over the top", OTT, anchoring to support mobility.

It will be obvious to the person skilled in the art, that the disclosure is not limited to the above legacy mobility mechanisms, but is also equally applicable to other mobility mechanisms that are yet to be specified.

Current regulations and business logic implies that existing outdoor networks sometimes remain separate. In the scenario disclosed in FIG. 1, there are multiple outdoor systems PLMN A and PLMN B operated by separate operators, and islands of local systems PLMN $X_1$ and PLMN $X_2$ that may be operated by a local system operator. These local systems may use licensed spectrum, unlicensed spectrum, or a mix of the two, or, indeed, hybrid spectrum licensing regimes.

When combining macro cellular networks and micro cellular networks, and migrating wireless devices, e.g., performing handover, cell selection and roaming, between these networks, inter-network mobility situations will require an increased need for collaboration and coordination between the different networks. A wireless device, also known as user equipment, UE, does not normally search for a new networks until coverage of current network is lost. This also applies to the situation with overlapping macro and micro cellular networks, where the wireless device 80 would stay with current network, PLMN B until coverage of this network is completely lost, even if the user has entered the building and its performance would be greatly improved by migrating, e.g., roaming onto the shared network. A remedy for this would be to continuously let the wireless device measure on new networks, but this would consume too much resources from ordinary transmissions. Furthermore, the wireless device does not normally know where in the frequency/channel domain to search for a new network and its identity, and so the search for target network can be quite time-consuming, taking several minutes.

While there is a need to improve collaboration and coordination for network migration operations, operators generally want to minimize interaction between each other to simplify the work and to reduce leakage of information about the network and its subscribers to other operators. This is also true for the case when a wireless device needs or would benefit from migrating between two networks.

Accordingly, there is a need for a solution to the problems identified above to provide solutions improving traffic distribution between a first network and a second network, e.g., a macro cellular network and a micro cellular network. More specifically, to enable the wireless device, whilst belonging to a first network, to start measurements only at the right locations or cells to find an available second network, e.g., a so called shared network island enabled by a micro cellular network, and to make those measurements efficient by providing adequate guidance to the wireless device on where to measure.

In the following, network centric solutions and wireless device centric solutions will be presented. However, it should be appreciated that solutions combining selected features of a network centric solution and a device centric solution are also within the scope of the present disclosure.

Figure 2A:
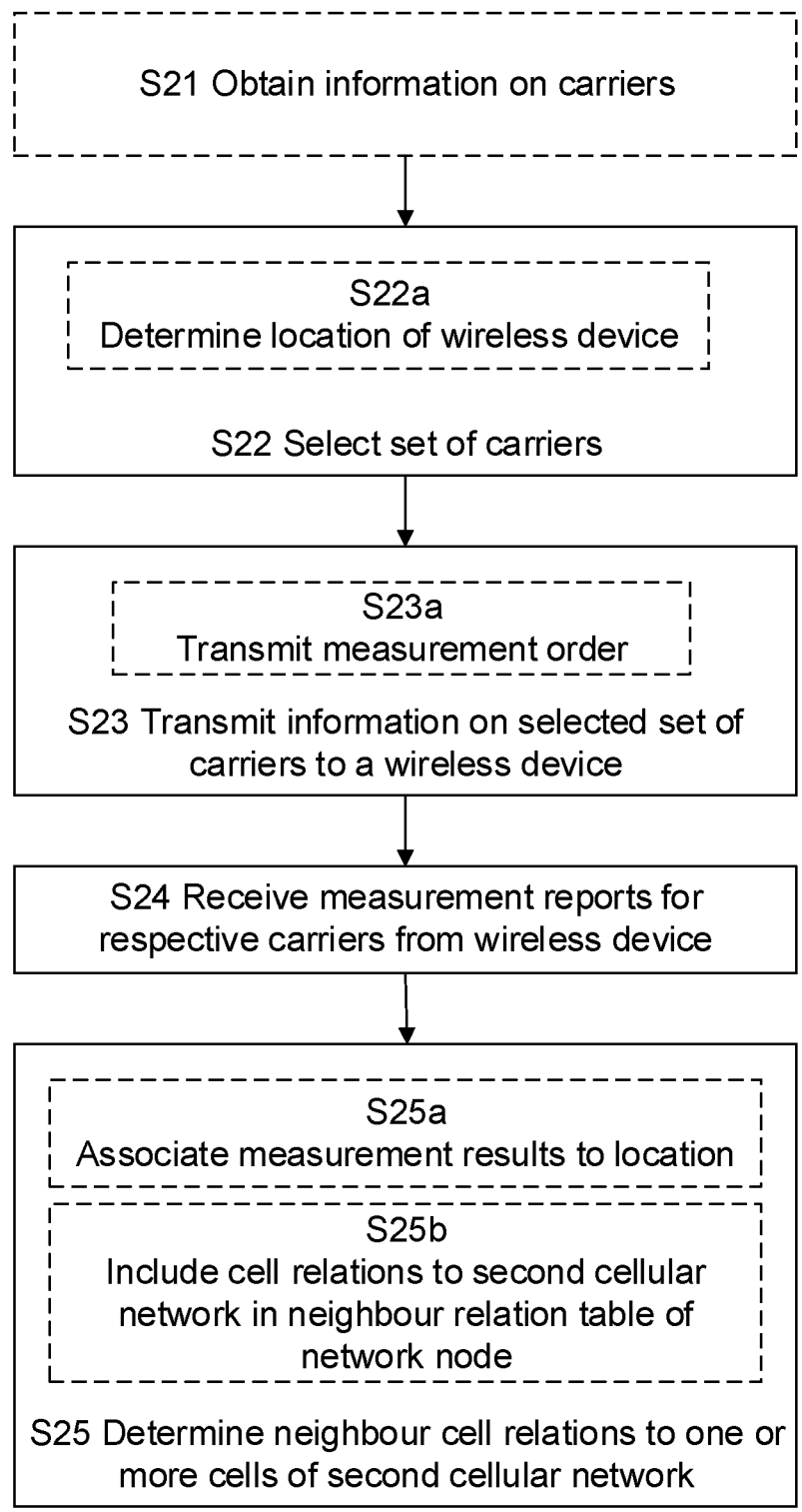
FIG. 2
a. is a flowchart illustrating exemplary method steps performed in a network node;
b. is a flowchart illustrating exemplary further method steps performed in a network node.
Figure 2B:
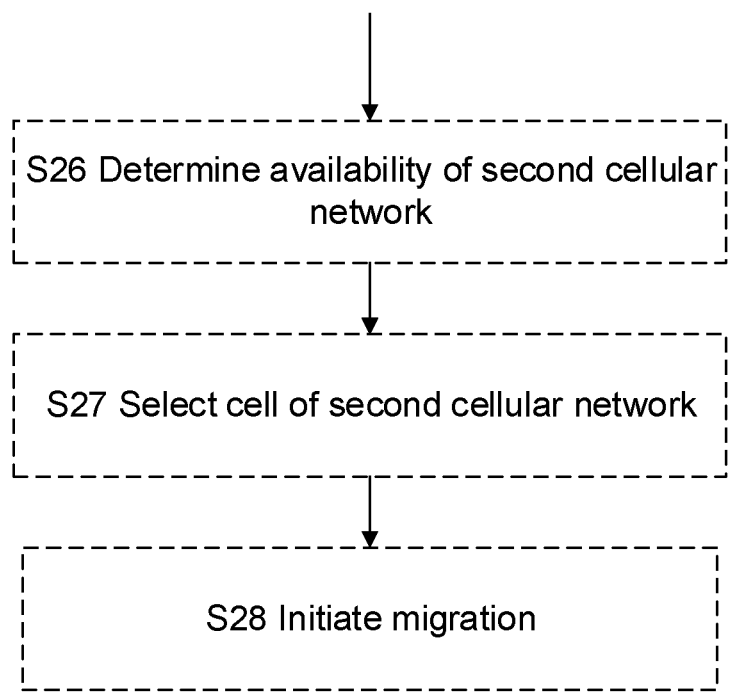

FIGS. 2a and 2b illustrates, in flowcharts, method steps performed in a network node to enable inter-network traffic distribution by designating one or more cells of a second network as neighbouring cells to the first network. The disclosure presents a proactive process of gathering information about the networks to perform neighbour mapping to be used as an input to a to distribution functionality, which executes the distribution.

In the network-centric case the distribution functionality requires an inter-network command procedure which could be implemented as policy data base downloaded to each wireless device. In the wireless device centric case, an algorithm is provided in the wireless device.

As an initial, optional step for designating cells of the second network as neighbouring cells to the first network, information on carriers employed in the second network could be obtained as illustrated in step S21. This implies proactively obtaining information on which predetermined frequencies/channels/identities are used by the second network, which the later wireless device measurements should be targeted at. This can be a network-wide list manually updated when needed in a state-of-the-art manner, or a dynamically compiled list using various information sources such as data bases.

According to another initial, optional step, the location of the wireless device is determined S22a to enable a pre-selection of potentially interesting carriers in the second network. There may be thousands of possible carrier frequencies and a pre-selection is beneficial to limit the time and energy consumed in the scanning process. The pre-selection can be generic for a location or region and only point at one or a few carriers known to relevant for the determined location. Further carriers may be included in the scanning by also taking into account neighbouring carriers to those identified for the network. secondsecond The pre-selection of potentially interesting carriers may depend on the particular wireless device in that different wireless devices may be operative in different further networks. Existing methods today comprise that related networks are known based on wireless device identity.

One enhanced method for the pre-selection is that one network only has knowledge about one or few carrier(s) of related networks and UEs are asked to report the set of other carriers used by that network, based on the System Broadcast read from cells on that carrier (all 3GPP standards list typically all carriers in order to support good Idle mode mobility). The initial subset of carrier(s) can be acquired by known addresses (URLs) for network-network query. The network can thus automatically learn and optimize also the pre-selected set of carrier frequencies. The UE can perform a similar mechanism.

In its most general form, the method of designating one or more cells comprises selecting S22 a set of carriers, also known as carrier frequencies, employed in the second network and transmitting S23 information for the selected set of carriers to a wireless device served by a cell of the first network. Thus, the gathering of information may be performed with one or more wireless devices that are in a general vicinity of a second network. Served by implies that the wireless device is known to the first network, and in a context of LTE specifically, served by could imply that the wireless device has a Radio Resource Control, RRC, connection in the radio interface. However, the wireless device could still be considered as served by a cell if the wireless device is known to the corresponding network node but still in an idle state. According to an aspect of the disclosure, the step of transmitting S23 information to the wireless device also comprises transmitting S23a a measurement order to the wireless device, the measurement order comprising one or more selected carriers for measuring.

The first network is generally a cellular network covering a larger area than the second network, but the disclosed procedure is also applicable in a scenario where the different cellular networks are only partially overlapping. In the following presentation, the first network is presumed to represent a macro cellular network, i.e., a cellular network in a licensed, unlicensed or partially licensed macro area, e.g., a public land mobile network providing service within an entire country. Several options are foreseen with regard to the spectrum of the first network, e.g. normal nationally licensed, locally licensed as for Citizens Broadband Radio Service Device, CBSD, Priority Access License, PAL, locally registered as CBSD General Authorized Access, GAA, and neither licensed/paid or registered as in 2.4 and 5 GHz bands. Returning to the scenario discussed in relation to FIG. 1, the second network represents a network operated by a different operator than the first network and providing coverage in an area that can best be described as an island, cape or peninsula within the area of the first network. According to an aspect of the disclosure, the first network could be on a CBSD PAL frequency while the second network is on a CBSD GAA frequency. However, the spectrum of the first network may also imply non-overlapping carrier frequencies, which may be in the same band as the spectrum used in the second network. Furthermore, the second spectrum may be locally licensed spectrum or an unlicensed spectrum, e.g., in accordance with MuLTEfire.

Thus, according to an aspect of the disclosure, the first network is a macro cellular evolved radio access network, macro E-UTRAN, operated in a first spectrum, and the second network is a micro cellular evolved radio access network, micro E-UTRAN, operated in a second spectrum different from the first spectrum, The micro E-UTRAN provides radio network coverage within an area of the macro E-UTRAN. According to an optional aspect of the disclosure, the micro E-UTRAN is a cellular network operated in a predetermined, confined area, e.g., within an outdoor arena, industry production plant, campus or open mine, etc. An indoor environment case is a further example of a confined area.

The wireless device, served by a cell of the first network performs measurements on one or more carriers belonging to the set of carriers for which information was provided and generates measurement reports for the respective carriers. The network nodes is configured to receive S24 measurement reports for respective carriers from the wireless device. The network nodes uses these received measurement reports to determine S25 neighbour cell relations between the wireless device serving cell of the first network and one or more cells of the second network based on the received measurement reports.

According to an aspect of the disclosure, the determining of neighbour cell relations between the first network and one or more cells of the second network comprises associating S25a the measurement results to a location in a location oriented map. Such a location oriented map could be a map just disclosing the cell geography of the second network, i.e., something that could be shared with other network operators without disclosing aspects of the own cellular network configuration. According to an optional aspect of the present disclosure, the network node is further configured to transmit information on the neighbor cell relations to one or more neighbouring network nodes of the first network or to one or more neighbouring network nodes of the second network, thereby sharing information on neighbor cell relations to neighbouring nodes.

According to an optional aspect of the disclosure, the determining of neighbour cell relations between the first network and one or more cells of the second network comprises including S25b neighbour cell relations of the second network in a neighbour relation table in the network node. Here the relations are associated to the cells of the first network, and thus comprises significant information also relating to the first network.

FIG. 2b discloses further optional aspects of the disclosure following the cell relations build up represented in FIG. 2a. Based on the determined neighbour cell relations, it is possible to proceed with real-time usage of this knowledge for performing mobility procedures, e.g. mobility procedures according to state of the art procedures. According to such further aspects, the method performed in the network node of the first wireless network also comprises determining S26 availability of the second network for wireless device connectivity based on the location of the wireless device, i.e., using the determined neighbour cells relation and the location of the wireless device to determine whether to migrate the wireless device to the second network. Proximity of the second network is detected for a specific network. When it is determined that the wireless device is in the vicinity of cells of the second network, measurements are scheduled on identified carriers. Step S26 may be performed with or without UE involvement. In a common case with UE involvement, the network node asks the UE to measure neighbour cells as determined from step S25. When the measurements indicate that the benefits of migration appear to overcome possible drawbacks of such migration, the network node selects S27 a cell of the second network and makes the selected cell known to the wireless device, e.g., by transmitting information on respective second network carrier to the device, for the performance of UE measurements to enable subsequent migration. The network node thereafter initiates S28 migration from the first network to the selected cell.

Figure 3:
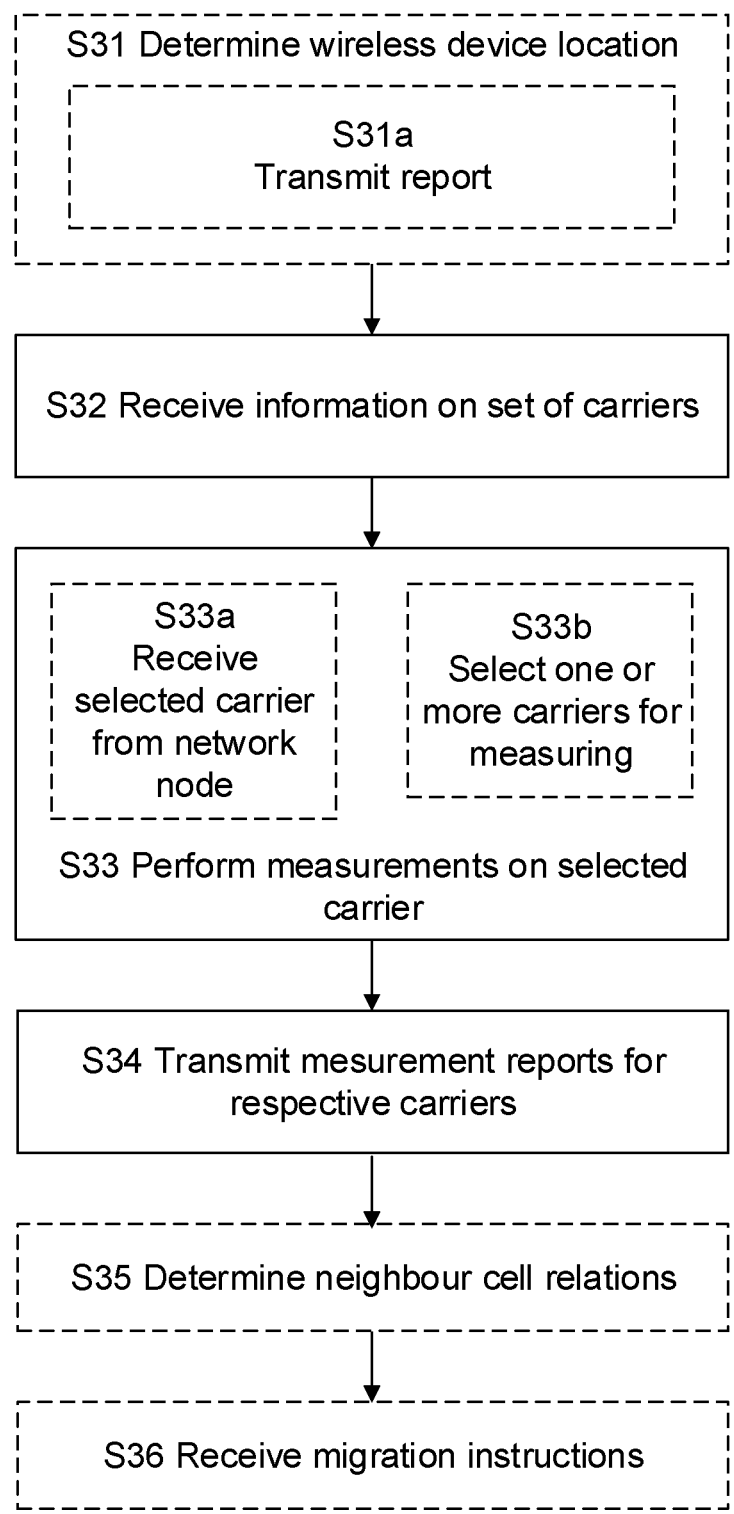
FIG. 3 is a flowchart illustrating exemplary method steps performed in a wireless device

FIG. 3 is a flow chart illustrating exemplary method steps performed in a wireless device. As mentioned above, the proposed method could be considered as a network centric solution as well as a device centric solution, and some features presented as performed in the wireless device will be optional in the network centric solution, while other features disclosed above for the network node will be optional in a device centric solution.

In an optional, preparatory step, information about the location of a second network is proactively gathered, in absolute geographical terms and/or in relation to the network nodes of the first network. This can be done using wireless device/user equipment, UE, measurements from UEs detecting identifiers of a second network. The wireless device may contribute in determining the location of the second network by determining its own location; in step S31 disclosed as determining S31 the location of the wireless device. Optionally, the location of the wireless device is reported to the serving network node by transmitting S31a a report comprising information on the location of the wireless device and/or proximity to the second network.

In its most general form, the method of designating one or more cells of a second network as neighbouring cells to the first network comprises receiving S32, from a network node defining a serving cell for the wireless device cell, information on a set of carriers employed in the second network. As mentioned above, such information may have been proactively obtained by the network node and comprises information on which predetermined frequencies/channels/identities that are used in the second network and which the later wireless device measurements should be targeted at. This can be a network-wide list manually updated when needed in a state-of-the-art manner, or a dynamically compiled list using various information sources such as data bases.

Following receipt of information relating to carriers, the wireless device is configured to perform measurements S33 on selected one or more carriers from the set of carriers, e.g., performing Quality of Service, QoS, measurements for each of the selected carriers. Optionally, the wireless device initiates such measurements following receipt S33a of a measurement order from the network node, the measurement order comprising one or more selected carriers for measuring. Alternatively, the performing of measurements comprises selecting S33b the one or more carriers for measuring when the wireless device is determined to be within a coverage area of the second network, i.e., in a wireless device centric performance, the wireless device makes the selection of the one more carriers for measuring.

The wireless device is further configured to transmit S34 measurement report, e.g., comprising the QoS measurements for respective carriers in measurement reports to the network node, the measurement reports being representative of neighbour cell relations between the wireless device serving cell and one or more cells of the second network.

In a UE-centric option, determination of neighbour cell relations may also be performed locally in each UE, as disclosed in step S35.

Optionally, the reporting wireless device will receive S36 migration instructions from the network node, the migration instructions based on neighbour cell relations between the serving cell of the wireless device and one or more cells of the second network.

Figure 4:
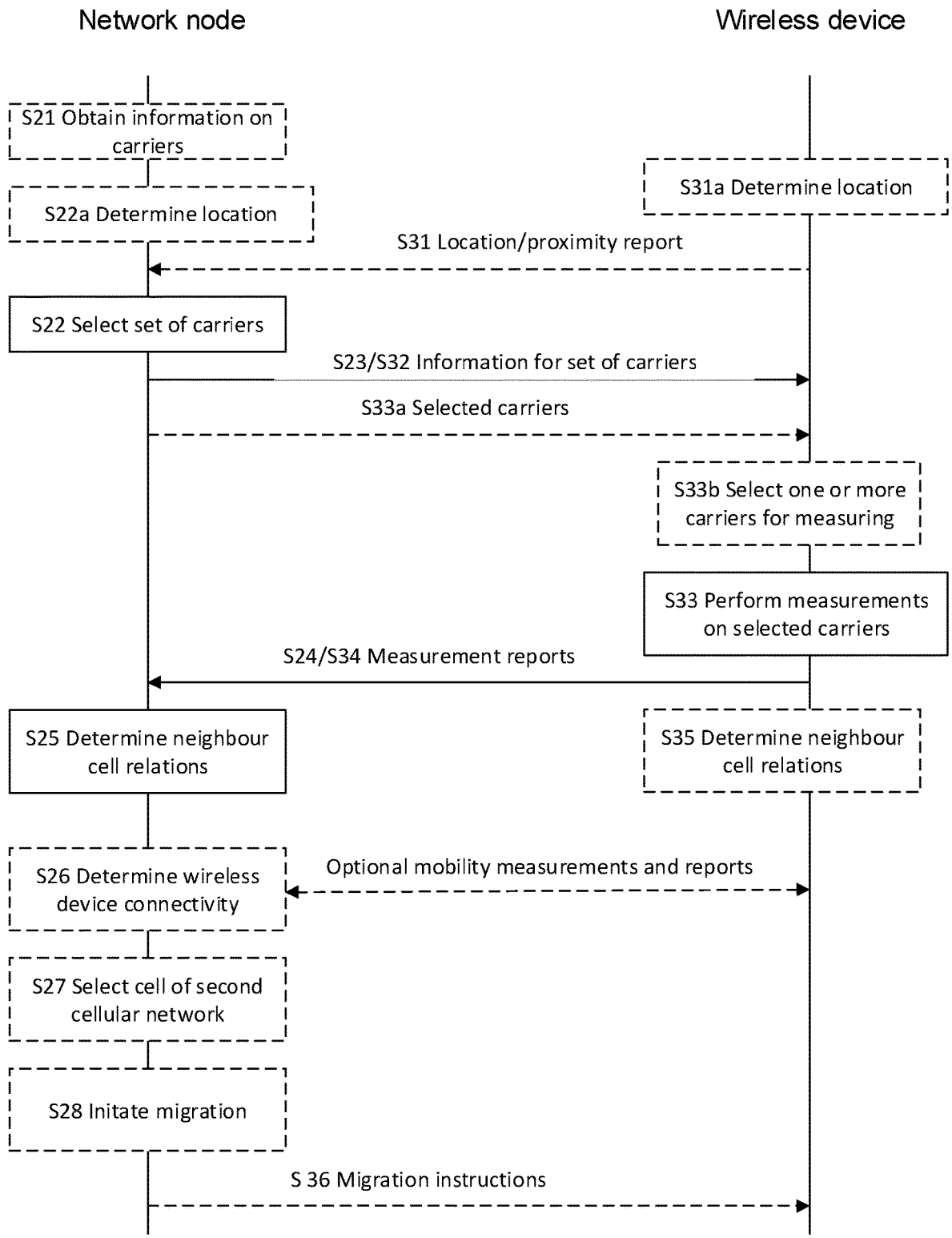
FIG. 4 is a signalling diagram illustrating signalling in an interface between the network node and the wireless device.

Turning to FIG. 4, a signalling diagram illustrating signalling in an interface between the network node and the wireless device is illustrated. In the signalling diagram, operations described above for FIGS. 2a, b and FIG. 3 are disclosed and are in full correspondence with the disclosure above.

FIG. 4 discloses to proactively obtain information on which predetermined frequencies/channels/identities are used by the shared network islands (which the later UE measurements should be targeted at). As mentioned above, this represents an optional step S21 that is performed in the network node of the first network. The information may be a network-wide list manually updated when needed in a state-of-the-art manner, or a dynamically compiled list using various information sources such as data bases.

FIG. 4 further discloses the proactive gathering of information about the locations of second network, either in absolute geographical terms and/or in relation to network node of the first network. The location may be determined in the network node, as illustrated by step S22a, or in the wireless device using wireless device measurements, illustrated by step S31a.

For the latter case, a location/proximity report may be transmitted S31 to the receiving network node to secure that the information on wireless device location and the information on second network location are available in the same entity (either within the wireless device, within the network or within both).

The receiving network node compares the received information and schedules measurements on selected/predetermined frequencies/channels for fast identification of cells of the second network, e.g., following a comparison of the location information and a determining that the wireless device is in the vicinity of a cell of the second network.

When identifying a cell of the second network, i.e., having determined neighbour cell relations, migration to the second network may be initiated by initiating mobility procedures according to state of the art procedures.

It should be noted that the wireless device measurement capability (number of monitored carriers and reporting latency, see e.g. 3GPP TS 36.133) makes it important to prioritize carriers; selecting set of carriers in S22. Furthermore, measurements on other carriers require measurement gaps, reducing the wireless device bit rate, so measurements should only be started when needed.

The determining S25 of neighbour cell relations building, e.g., building of a map may be based on all available data from the wireless device and networks measurements, experiences of past network data, and information from planning tools, etc. The map can be built up in everything from simple methods to advanced data-driven methods using machine learning algorithms.

A "map storage entity" (built in step S25) may be separate from the network node, eNB, so that maps built by multiple eNBs may distributed/shared among all eNBs. In the case where the map is formulated in terms of relations to first network, in need of network planning integrity, each such non-shared network must build its own map. However, when the map is built partly or fully in terms of absolute geographical positions of the shared network islands, that map can in principle be common between multiple players. Turning to FIG. 1, operators of PLMN A and PLMN B may use a common map relevant for the cell relations of PLMN $X_1$ or PLMN $X_2$.

Figure 5:
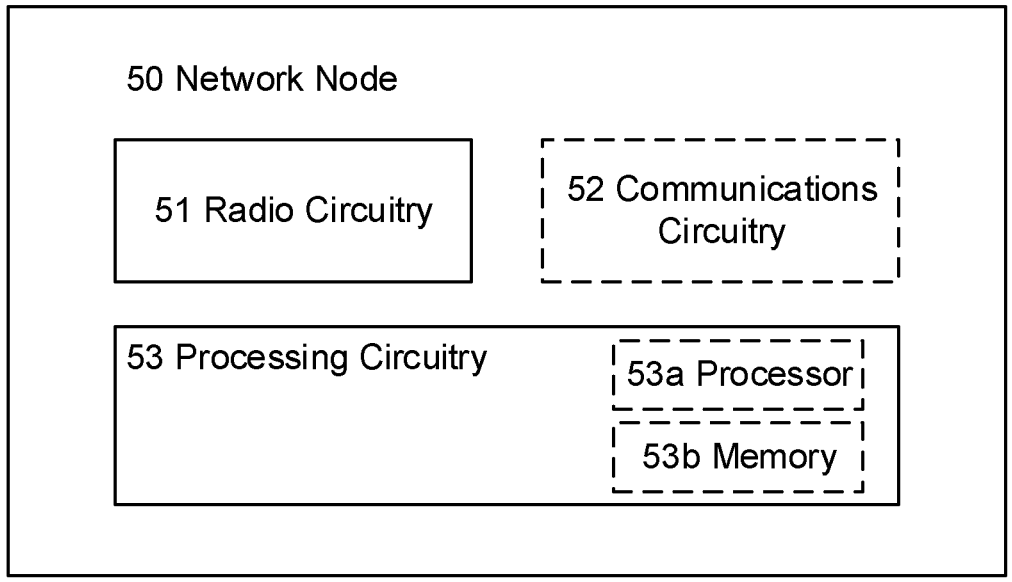
FIG. 5 illustrates an example node configuration for a radio network node.

The embodiments outlined above represents an example of functional distribution between network and UE. Any mix of responsibility of obtaining and storing information, making measurements, taking decisions, etc, in steps 1-5 are conceivable FIG. 5 illustrates an example node configuration for a network node configured to perform the above discussed operations. The network node 50 is configured for operation in a first network for designating one or more cells of a second network as neighbouring cells to the first network. The network node comprises radio circuitry 51 arranged for transmission and reception of radio signals; and processing circuitry 53 configured to cause the network node to perform the above disclosed operations. Thus, the processing circuitry is configured to cause the network node to select a set of carriers employed in the second network and to transmit, using the radio circuitry, information for the selected set of carriers to a wireless device served by a network node to receive, using the radio circuitry, measurement reports for respective carriers from the wireless device; and to determine neighbour cell relations between the first network and one or more cells of the second network based on the received measurement reports. According to an aspect of the disclosure, the processing circuitry comprises a processor S53$a$ and a memory S53$b$ storing the computer-executable instructions for execution in the processor S53$a$.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVDs, etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 6:
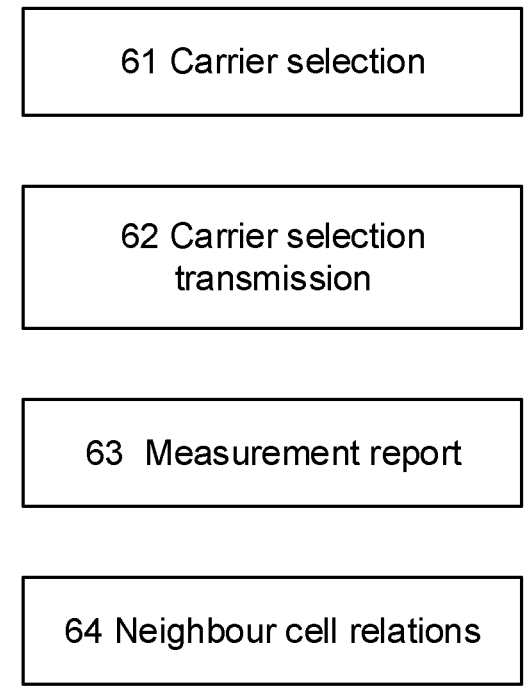
FIG. 6 illustrates an example node configuration for a radio network node.

FIG. 6 schematically disclose an example node configuration wherein computer implemented modules aggregate to a network node. Thus, FIG. 6 discloses a different representation of a network node 60 configured for operation in a first network for designating one or more cells of a second network as neighbouring cells to the first network. The network node comprises one or several of: a carrier selection module 61 configured to select a set of carriers employed in the second network; a carrier selection transmission module configured to transmit, using the radio circuitry, information for the selected set of carriers to a wireless device served by a cell of the first network. A measurement report module is configured to receive, using the radio circuitry, measurement reports for respective carriers from the wireless device. Neighbour cell relations between the first network and one or more cells of the second network are determined based on the received measurement report in a neighbour cell relations module.

Figure 7:
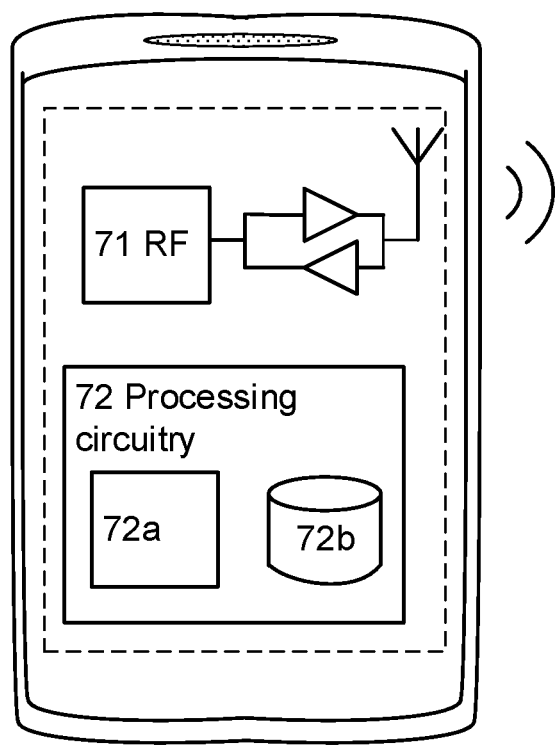
FIG. 7 illustrates an example wireless device configuration.

FIG. 7 illustrates an example node configuration for a wireless device configured to perform the above discussed operations. The wireless device 70 comprises radio circuitry (71) arranged for transmission and reception of radio signals and processing 73 configured to, using the radio circuitry, cause the wireless device to receive information on a set of carriers employed in the second network; perform measuring on selected one or more carriers from the set of carriers; and transmit measurement reports for respective carriers to the network node, the measurement reports being representative of neighbour cell relations between the wireless device serving cell and one or more cells of the second network. According to an aspect of the disclosure, the processing circuitry comprises a processor S73$a$ and a memory S73$b$ storing the computer-executable instructions for execution in the processor S73$a$.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVDs, etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 8:
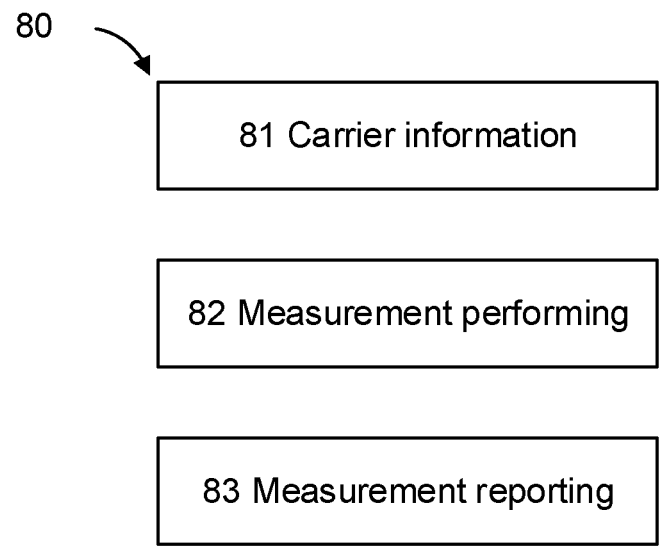
FIG. 8 illustrates an example wireless device configuration.

FIG. 8 schematically discloses an example wireless device configuration wherein computer implemented modules aggregate to a wireless device. Thus, FIG. 8 discloses a different representation of a wireless device 80 configured for operation in a first network for designating one or more cells of a second network as neighbouring cells to the first network. The wireless device comprises one or several of: a carrier information module 81 configured to receive information on a set of carriers employed in the second network; a measurement performing module configured to perform measuring on selected one or more carriers from the set of carriers; and a measurement reporting module configured to transmit measurement reports for respective carriers to the network node, the measurement reports being representative of neighbour cell relations between the wireless device serving cell and one or more cells of the second network.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated.

In the drawings and detailed description, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a network node of a first network, for designating one or more cells of a second network as neighbouring cells to the first network, the method comprising:
   selecting a set of carriers employed in the second network based on a location of a wireless device;
   transmitting information for the selected set of carriers employed in the second network to the wireless device served by the first network;
   receiving measurement reports for respective ones of the set of carriers employed in the second network from the wireless device; and
   determining neighbour cell relations between the first network and one or more cells of the second network based on the received measurement reports,
   wherein the determining of neighbour cell relations between the first network and one or more cells of the second network comprises associating measurement results and the location of the wireless device to a location in a location oriented map which defines cell geography of the second network, and further comprising using the cell geography of the second network disclosed by the location oriented map to determine when another wireless device becomes proximately located to the second network, and determining the second network has become available for migration by the other wireless device when it is determined that the other wireless device has become proximately located to the second network.

2. The method of claim 1, wherein the first network is a macro cellular evolved radio access network, macro E-UTRAN, operated in a first spectrum, and the second network is a micro cellular evolved radio access network, micro E-UTRAN, operated in a second spectrum different from the first spectrum and wherein the micro E-UTRAN provides radio network coverage within an area of the macro E-UTRAN.

3. The method of claim 2, wherein the micro E-UTRAN is a cellular network operated in a predetermined, confined area.

4. The method of claim 2, wherein the first spectrum is a licensed spectrum and/or the second spectrum is a locally licensed spectrum.

5. The method of claim 1, the method further comprising:
   obtaining information on carriers employed in the second network.

6. The method of claim 1, the method further comprising:
   transmitting a measurement order to the wireless device, the measurement order comprising one or more selected carriers for measuring.

7. The method of claim 1, wherein the determining of neighbour cell relations between the first network and one or more cells of the second network comprises including neighbour cell relations of the second network in a neighbour relation table in the network node.

8. The method of claim 1, further comprising:
   determining availability of the second network for wireless device connectivity based on the location of the wireless device;
   selecting a cell of the second network; and
   initiating migration from the first network to the selected cell.

9. The method of claim 1, further comprising transmitting information on the neighbor cell relations to one or more neighbouring network nodes of the first network or to one or more neighbouring network nodes of the second network.

10. A network node configured for operation in a first network for designating one or more cells of a second network as neighbouring cells to the first network, the radio network node comprising:
   radio circuitry arranged for transmission and reception of radio signals;
   processing circuitry configured to cause the network node to:
      select a set of carriers employed in the second network based on a location of a wireless device;
      transmit, using the radio circuitry, information for the selected set of carriers employed in the second network to the wireless device served by the first network;
      receive, using the radio circuitry, measurement reports for respective ones of the set of carriers employed in the second network from the wireless device; and
      determine neighbour cell relations between the first network and one or more cells of the second network based on the received measurement reports,
      wherein the determining of neighbour cell relations between the first network and one or more cells of the second network comprises associating measurement results and the location of the wireless device to a location in a location oriented map which defines cell geography of the second network, and further comprising using the cell geography of the second network disclosed by the location oriented map to determine when another wireless device becomes proximately located to the second network, and determining the second network has become available for migration by the other wireless device when it is determined that the other wireless device has become proximately located to the second network.

\* \* \* \* \*